United States Patent
Lovvik et al.

(10) Patent No.: US 7,624,132 B2
(45) Date of Patent: Nov. 24, 2009

(54) METHOD AND APPARATUS FOR PROCESSING A STREAMED ZIP FILE

(75) Inventors: Paul A. Lovvik, Boulder Creek, CA (US); Junaid A. Saiyed, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1612 days.

(21) Appl. No.: 10/051,277

(22) Filed: Jan. 22, 2002

(65) Prior Publication Data

US 2003/0140065 A1    Jul. 24, 2003

(51) Int. Cl.
    *G06F 12/00* (2006.01)
(52) U.S. Cl. ...................................................... 707/204
(58) Field of Classification Search .................. 707/1, 707/10, 200–204, 103 R; 709/239
    See application file for complete search history.

(56) References Cited

U.S. PATENT DOCUMENTS 6,311,221 B1 * 10/2001 Raz et al. .................... 709/231
6,427,149 B1 * 7/2002 Rodriguez et al. ............ 707/10
6,442,558 B1 * 8/2002 Brown et al. ................ 707/102
6,574,618 B2 * 6/2003 Eylon et al. .................... 707/1
2002/0120639 A1 * 8/2002 Basin et al. ................ 707/204

OTHER PUBLICATIONS

Basin et al., "System and Method for Manipulating and Managing Computer Archive Files", Aug. 29, 2002, USPA Pub., 2002/0120639, pp. 1-21.*
Hendler et al., "Streaming of Archive Files", Apr. 11, 2002, USPA Pub., 2002/0042833, pp. 1-21.*
Appnote.Txt—.ZIP File Format Specification, Version 4.5, Revised Nov. 1, 2001, PKWare Inc.

* cited by examiner

Primary Examiner—Sathyanarayan Pannala
(74) Attorney, Agent, or Firm—Sonnenschein Nath & Rosenthal LLP

(57) ABSTRACT

In accordance with the invention, there is provided a method and apparatus for receiving a streamed zip file and accessing contents of the zip file's central directory. The zip file is made up of a set of files and a central directory. A zip receiver opens up a stream and reads in the zip file. A zip interface is provided to access the contents of the zip file's central directory as the central directory is received by the zip receiver.

19 Claims, 4 Drawing Sheets

METHOD AND APPARATUS FOR PROCESSING A STREAMED ZIP FILE

DESCRIPTION OF THE INVENTION

1. Field of the Invention

The present invention relates to receiving a streamed zip file and, more particularly, to accessing a central directory of the streamed zip file as it is received.

2. Background of the Invention

Streaming refers to a process by which data flows into and out of an application or program. An output stream refers to the process of writing data to an external destination such as a file, a printer, a display, a network, or any device coupled to a computer for receiving data. An input stream refers to the process of reading data from an information source such as a file, memory, or a socket. To bring in information, a program opens a stream on the information source and reads the information sequentially into a stream buffer. Similarly, a program can send information to an external destination by opening a stream to a destination and writing the information out sequentially. No matter where the data is coming from or going to and no matter what its type, the algorithms for sequentially reading and writing data are basically the same. To read data, the algorithm opens a stream, and as long as information exists in the stream the algorithm reads that information. Conversely, to write a stream, the algorithm opens a stream, and as long as information exists in the stream the algorithm writes that information.

Because compression techniques are often implemented so that data can be transferred as efficiently as possible, computer programs must perform streaming input and output with compressed files. One type of compressed file is a "zip" file. A zip file is formatted according the zip file format provided by PKWare, Inc. For a detailed explanation of the zip file format, see the APPNOTE.TXT—zip File Format Specification© 1989-2001 PKWARE Inc., at www.pkware.com/support/appnote.html, which is hereby incorporated by reference. Compressed files that are formatted according to the zip file format include JAR (Java Archive) files which are used for storing Java files and WAR (web archive) files which are useful for importing complete web applications into a web server engine or to a development environment.

Zip files are made up of a set of files and a central directory. The central directory includes file attributes that are essential to the operation of the zip file. Currently, computer programs that stream in a zip file are unable to access the zip file's central directory as the central directory is received. This is because computer programming languages do not provide an Application Program Interface (API) for accessing a zip file's central directory as it is received.

For example, the Java™ Development Kit (JDK) from Sun Microsystems, Inc. enables developers to write object-oriented programs using an API associated with a predefined set of "classes," each of which provides a template for the creation of "objects" sharing certain attributes determined by the class. These attributes typically include a set of data fields and a set of methods for manipulating the object. The classes are defined using the Java™ programming language. The Java programming language is described, for example, in a text entitled "The Java Language Specification" by James Gosling, Bill Joy, and Guy Steele, Addison-Wesley, 1996. The classes form a library that defines a hierarchy of classes with a child class (i.e., subclass) inheriting attributes (i.e., fields and methods) of its parent class. Instead of having to write all aspects of a program from scratch, programmers can simply include selected classes from the API in their programs and extend the functionality offered by such classes as required to suit the particular needs of a program. This effectively reduces the amount of effort generally required for software development.

The JDK also includes a compiler and a runtime environment with a virtual machine (VM) for executing programs. In general, software developers write programs in a programming language (in this case the Java programming language) that use classes from the API. Using the compiler, developers compile their programs into "class files" containing instructions for an abstract computing model embodied by the Java VM; these instructions are often called "bytecodes." The runtime environment has a class loader that integrates the class files of the application with selected API classes into an executable application. The Java VM then executes the bytecodes on the host operating system/computer hardware. The Java VM thus acts like an abstract computing machine, receiving instructions from programs in the form of bytecodes and executing these bytecodes. Details on the VM for the JDK can be found in a text entitled "The Java Virtual Machine Specification," by Tim Lindholm and Frank Yellin, Addison Wesley, 1996.

The JDK includes tools for streaming zip files to and from Java applications. These tools provide software developers with a library of object oriented functions for streaming zip files that are local to the hardware platform in which the Java application is executing or that are on a remote platform and are streamed through a network. However, the tools for streaming zip files do not allow a Java application access to the contents of the central directory as it is received. Because the central directory contains key file attributes that may be necessary for the execution of a program contained in a zip file, it is necessary to access the central directory.

SUMMARY OF THE INVENTION

In accordance with principles consistent with the present invention, there is provided a method and apparatus for receiving a streamed zip file and accessing a central directory of the zip file as it is received. The zip file is made up of a set of one or more files and a central directory. A zip receiver opens up a stream and reads in a zip file. A zip interface is provided to access the contents of the zip file's central directory as the central directory is received by the zip receiver. When the zip receiver reads in a central directory header, the zip interface accesses the contents of the central directory header. When the zip receiver reads in the end of central directory record, the zip interface accesses the contents of the end of central directory record.

Additional aspects of the invention will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention.

DETAILED DESCRIPTION

The present invention is a method and apparatus for receiving a streamed zip file and accessing a central directory of the zip file as it is received.

The zip file is made up of a set of one or more files and a central directory. The central directory contains a set of central directory headers associated with each of the files contained in the zip file and an end of central directory record. When an application program requires a zip file from an external source, the application program initiates a zip receiver to open up a stream and read in the zip file. A zip interface is provided for the application program to access the contents of the zip file's central directory as the central directory is received by the zip receiver. The application program may call the zip interface to access the contents of a central directory header when the zip receiver reads in the central directory header. The application program may also call the zip interface to access the contents of the end of central directory record when the zip receiver reads in the end of central directory record. Accordingly, the application program is able to utilize the set of files contained in the zip file without first saving the entire zip file and subsequently referencing it.

Reference will now be made in detail to the exemplary embodiments of the invention, examples of which are illustrated in the accompanying drawings. Wherever possible, the same reference numbers will be used throughout the drawings to refer to the same or like parts.

Figure 1:
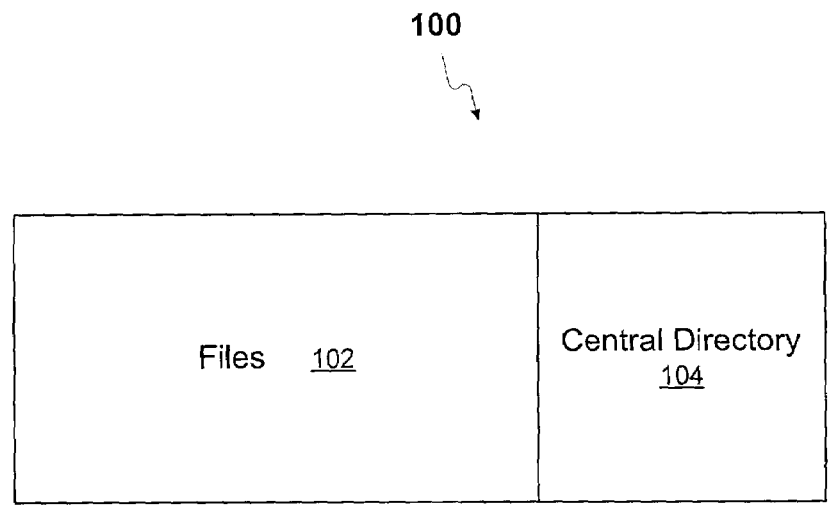
FIG. 1 is a block diagram of an embodiment of a file in the zip file format.

Referring to FIG. 1, there is shown a block diagram of an embodiment of a compressed file 100 in the zip file format. The zip file 100 is made up of a set of one or more files 102 and a central directory 104. Each of the files 102 includes a local file header, file data and a data descriptor. The central directory 104 contains a set of central directory file headers associated with each file in the set of files 102, and an end of central directory record. The fields included in each of the central directory headers are as follows:

Central file header signature (4 bytes): This is to identify the central directory file header.

Version made by (2 bytes): The upper byte indicates the host system (OS) for the file. Software can use this information to determine the line record format for text files etc. The lower byte indicates the version number of the software used to encode the file.

Version needed to extract (2 bytes): This identifies the minimum software version needed to extract the file.

General purpose bit flag (2 bytes): The upper three bits are reserved and used internally by the software when processing the zip file. The remaining bits are unused.

Compression method (2 bytes): This identifies the compression method used for compressing the contents of this file.

Date and time fields (2 bytes each): The date and time are encoded in standard MS-DOS format. If input came from standard input, the date and time are those at which compression was started for this data.

CRC-32: (4 bytes): The CRC-32 algorithm was contributed by David Schwaderer and can be found in his book "C Programmers Guide to NetBIOS" published by Howard W. Sams & Co. Inc. The CRC-32 algorithm is used for checking data transmission errors.

Compressed size (4 bytes) and Uncompressed size (4 bytes): The size of the file compressed and uncompressed, respectively.

Filename length (2 bytes), Extra field length (2 bytes), File comment length (2 bytes): The length of the filename, extra field, and comment fields respectively. The combined length of any directory record and these three fields should not generally exceed 65,535 bytes. If input came from standard input, the filename is set to "-" (length one).

Disk number start (2 bytes): The number of the disk on which this file begins.

Internal file attributes (2 bytes): The lowest bit of this field indicates, if set, that the file is an ASCII or text file. If not set, the file contains binary data. The remaining bits are unused.

External file attributes (4 bytes): The mapping of the external attributes is host-system dependent (see 'version made by'). For example, in MS-DOS, the low order byte is the MS-DOS directory attribute byte. If input came from standard input, this field is set to zero.

Relative offset of local header (4 bytes): This is the offset from the start of the first disk on which this file appears, to where the local header should be found.

Filename (Variable size): This is the name of the file, with optional relative path. The path stored should not contain a drive or device letter, or a leading slash. All slashes should be forward slashes '/' as opposed to backwards slashes '\' for compatibility with Amiga and Unix file systems etc. If input came from standard input, the file name is set to "-" (without the quotes).

Extra field (Variable size): This is for future expansion. If additional information needs to be stored in the future, it should be stored here. Earlier versions of the software can then safely skip this field.

File comment (Variable): This is the comment for this file.

The above-described fields are included in each of the central directory headers. As set forth above, the central directory 104 also includes an end of central directory record. The fields contained in the end of central directory record are as follows:

End of central directory signature (4 bytes): This is to identify the end of central directory record.

Number of the disk (2 bytes): The number of the disk which contains the end of central directory record.

Number of the disk with the start of the central directory (2 bytes): The number of the disk on which the central directory starts.

Total number of entries in the central directory on this disk (2 bytes): The number of central directory entries on this disk.

Total number of entries in the central directory (2 bytes): The total number of files in the zip file.

Size of the central directory (4 bytes): The size (in bytes) of the entire central directory.

Offset of start of central directory with respect to the starting disk number (4 bytes): Offset of the start of the central directory on the disk on which the central directory starts.

Zipfile comment length (2 bytes): The length of the comment for this zip file.

Zipfile comment (Variable size): The comment for this zip file.

Figure 2:
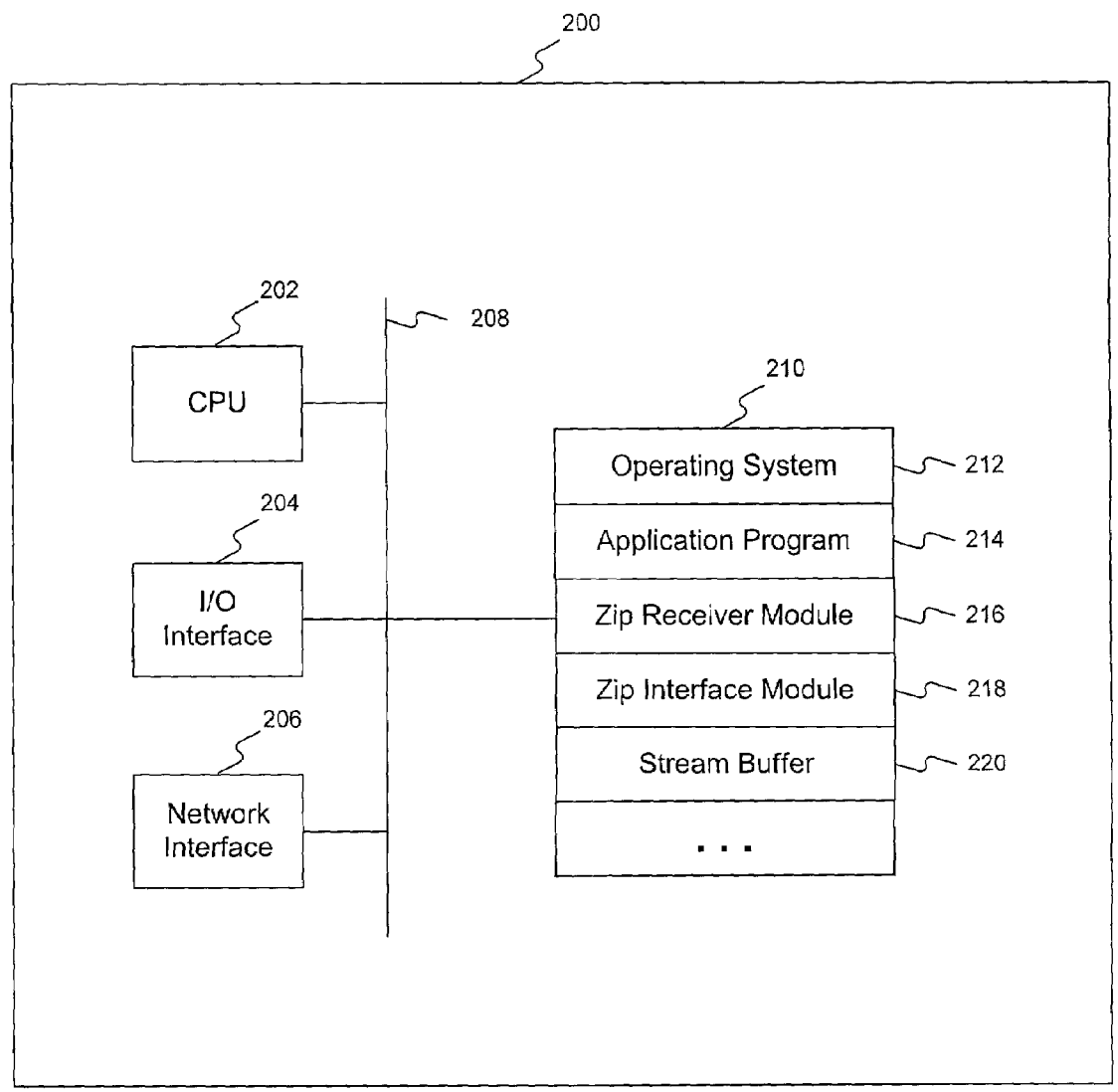
FIG. 2 is a block diagram of a system in accordance with an embodiment of the present invention.

Referring to FIG. 2, there is provided a block diagram of a system 200 in accordance with an embodiment of the present invention. In this embodiment, System 200 includes a CPU 202, an I/O interface 204, a network interface 206, memory 210, and a system bus 208 for interconnecting the aforementioned system elements. The I/O interface 204 is used to couple the system 200 to a keyboard, mouse, display device, disk storage device or any other peripheral device. The network interface 206 is used to interface system 200 with a network (not shown) which, in one embodiment is the Internet, although it may be any other data communications network.

Memory 210 stores an operating system 212 for managing operations of system 200, an application program 214, a zip receiver module 216 for receiving a streamed zip file using stream buffer 220, and a zip interface module 218 for accessing a central directory of a streamed zip file as it is received.

The application program 214 is a computer program that streams a zip file from an external source. An example of an application program 214 that calls for a zip file is an installer. An installer is a utility program for installing a target application onto a system. The target application that the installer must install is very often compressed in the zip file format. The installer must access the contents of the zip file containing the target application in order to configure the system and install the application. In particular, in order for the installer to properly install the target application, it is useful for the installer to access the file attributes stored in the central directory of the zip file. For example, certain files in the target application may have permissions associated with them that are necessary for proper installation of the application. If the installer can access the file attributes in the central directory while reading in the zip file, the installer does not need to configure the system after the entire target application has been loaded. The application program 214 initiates the zip receiver module 216 to open the stream and read in the zip file. The zip file is streamed from any source including, without limitation, from main memory, from secondary storage such as a hard disk (not shown) via the I/O interface 204, or from a server (not shown) via the network interface 206. The zip receiver module 216 reads in sections of the zip file to the stream buffer 220.

Figure 3:
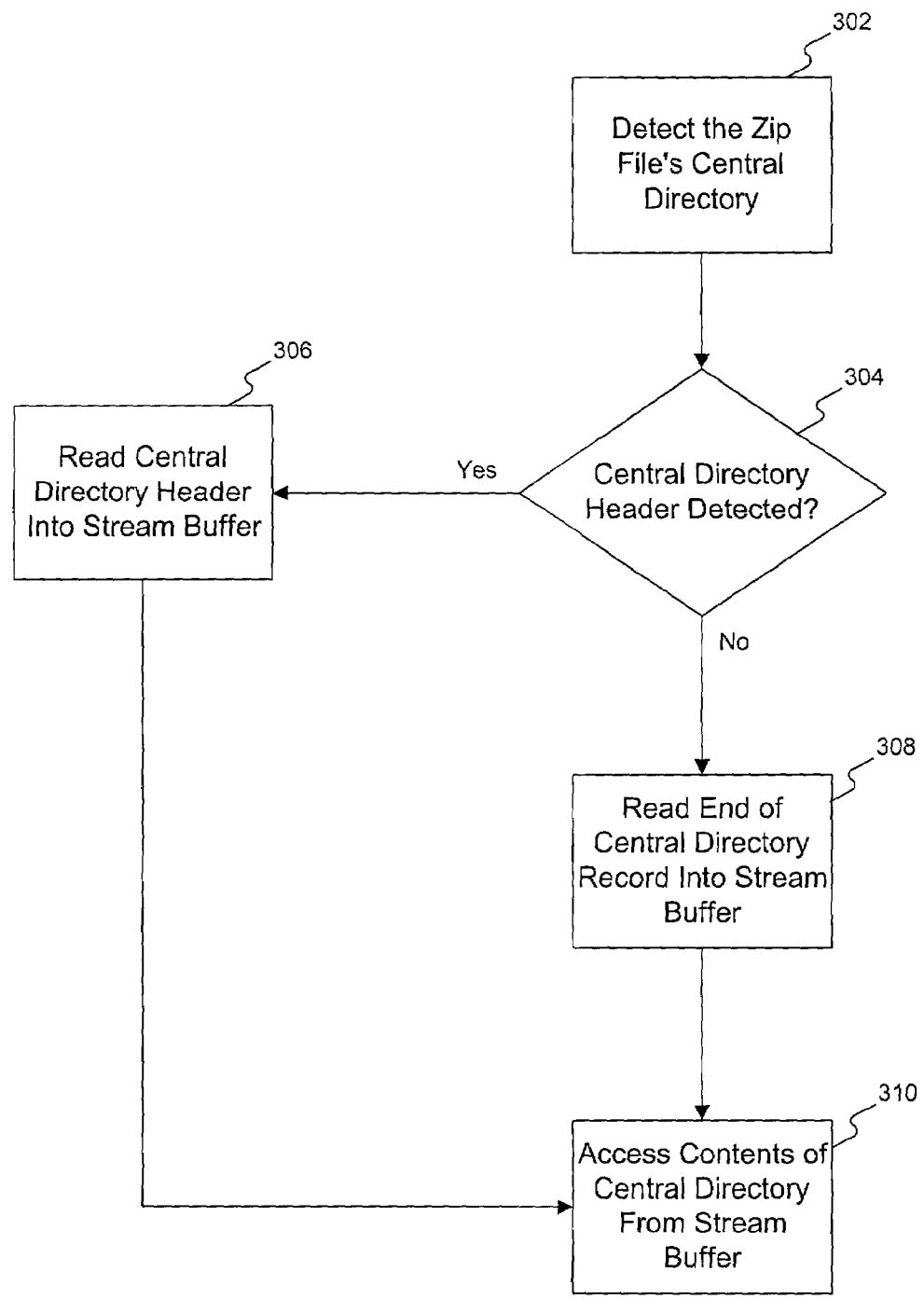
FIG. 3 is a flow diagram of a method for accessing a received zip file in accordance with an embodiment of the present invention.

Referring to FIG. 3, there is shown a method for receiving and accessing a streamed zip file in accordance with an embodiment of the present invention. The zip receiver module 216 detects (step 302) that the contents of the central directory will be received. The zip receiver module 216 detects a central directory header by reading in a central file header signature. The zip receiver module 216 detects the end of central directory record by reading in the central file header signature. If a central directory header is detected (step 304), the zip receiver module 216 reads (step 306) the entire central directory header into the stream buffer 220. If the end of central directory record is detected, the zip receiver module 216 reads (step 308) the entire end of central directory record into the stream buffer 220. The application program 214 then calls the zip interface module 218 to access (step 310) the contents of the zip file's central directory as it is read by the zip receiver module 216. The zip interface module 218 provides an interface for the application program 214 to access the contents of the central directory from the stream buffer 220. For example, the application program 214 calls the zip interface module 218 in order to get the zip file comment when it is received. When the application program 214 recognizes that the zip receiver module 216 has read in the end of central directory record, the application program calls the zip interface module 218. The zip interface module 218 reads the end of central directory record stored in the stream buffer 220 into a data structure and passes the data structure to the application program 214. The application program 214 is then able to access the zip file comment. Because the zip interface module 218 provides access to the contents of the zip file's central directory directly from the stream buffer 220, the application program 214 does not need to save the entire zip file in order to access the contents of the central directory.

Figure 4:
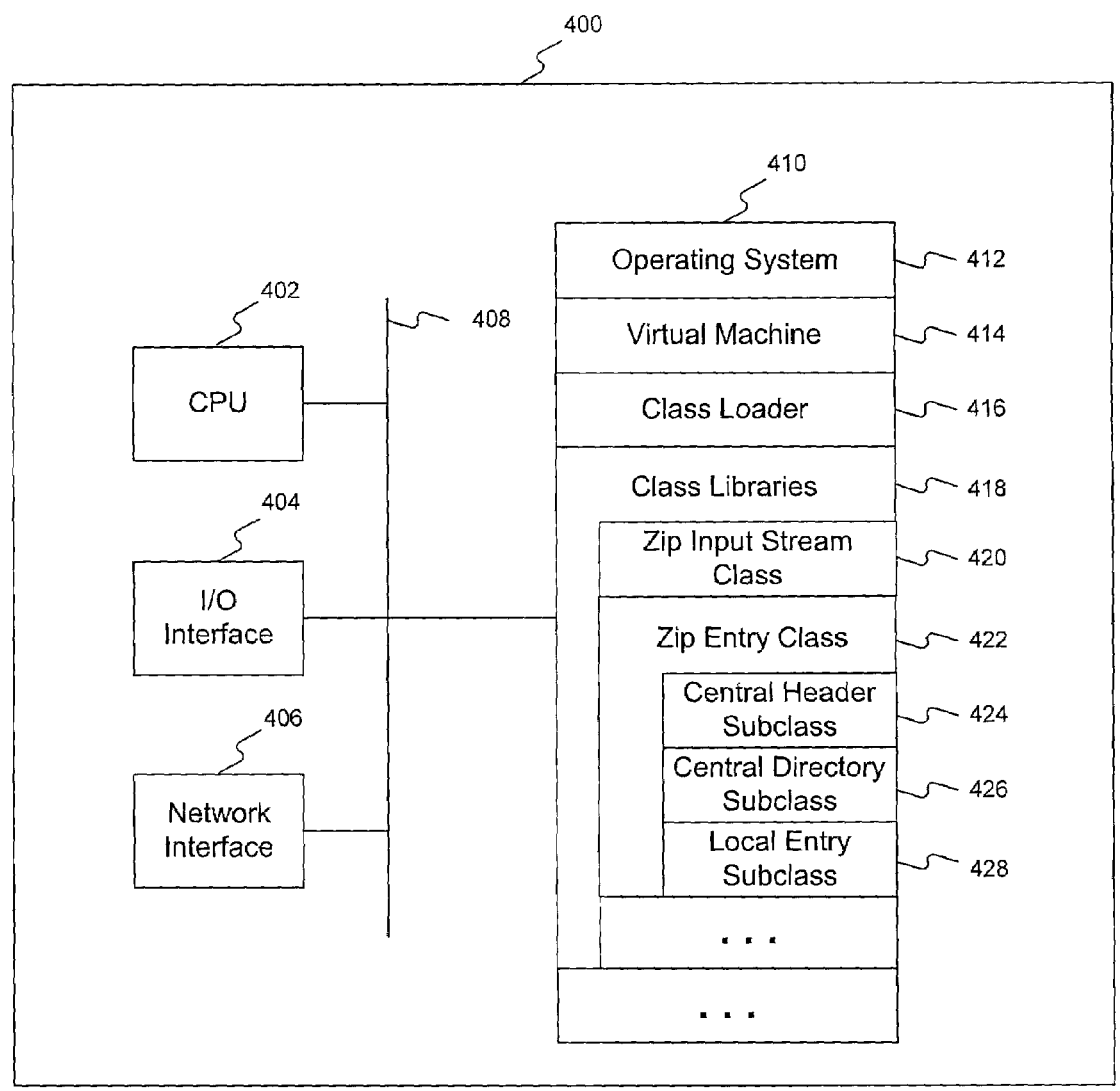
FIG. 4 is a block diagram of a system in accordance with a Java implementation of an embodiment of the present invention.

Referring to FIG. 4, there is provided a block diagram of a system 400 in accordance with a Java implementation of an embodiment of the present invention. In this embodiment, the system 400 includes a CPU 402, an I/O interface 404, a network interface 406, memory 410, and a system bus 408 for interconnecting the aforementioned system elements. The I/O interface 404 is used to couple the system 400 to a keyboard, mouse, display device, disk storage device or any other peripheral device that may be coupled to the system 400. The network interface 406 is used to communicate with a network (not shown) which, in one embodiment is the Internet, although it may be any other data communications network Memory 410 includes an operating system 412 for managing the programs in memory, a virtual machine 414, a class loader 416, class libraries 418 containing object classes including a zip input stream class 420 for receiving the zip input stream and a zip entry class 422 for accessing the contents of the streamed zip file. The zip entry class 422 includes a central header subclass 424 containing methods for accessing the contents of the central directory header and a central directory subclass 426 containing methods for accessing the contents of the end of central directory record. The zip entry class 422 also includes a local entry subclass 428 for accessing the contents of the set of files included in the streamed zip file.

When a bytecode program is initiated, the class loader 416 loads one or more of the appropriate object classes for given operations specified by the bytecode program. Each class contains a set of methods that may be invoked by the bytecode program. The virtual machine 414 interprets the bytecode program and the object classes in order for the system 400 to execute the various methods specified by the bytecode program. When the bytecode program calls for input data from a zip file, the zip input stream class 420 is invoked from the class libraries 418 to open a stream and read in the data. The zip input stream class 420 contains classes and methods allowing the bytecode program to read the input stream of data. An example of the API describing the set of methods provided by the zip input stream class 420 is described in Table 1. The zip input stream class 420 reads the contents of the zip file and maps each section of the zip file into an object instance of one of the subclasses of the zip entry class 422. The bytecode program accesses the object through methods provided by the appropriate subclass of the zip entry class 422. More specifically, when the zip input stream class 420 detects a central directory header, it instantiates a central header object and reads the central directory header into the object. The central header object is an instance of the central header subclass 424. The central header object is, in one embodiment, a structure containing each of the central directory header fields as described above. The bytecode program calls a method associated with the central header subclass 424 in order to access the contents of the central directory header. An example of a set of methods associated with the central header subclass 424 is shown in Table 2. When the zip input stream class 420 detects the end of central directory record, it instantiates a central directory object and reads the end of central directory record into the central directory object. The central directory object is an instance of the central directory subclass 426. The central directory object is, in one embodiment, a struct containing each of the fields of the end of central directory record as described above. The bytecode program calls a method associated with the central directory subclass 426 in order to access the contents of the central directory object. An example of a set of methods associated with the central directory subclass 426 is shown in Table 3.

TABLE 1

Example of the Methods Associated With Zip Input Stream Class.

| Method | Description |
| --- | --- |
| void close( ) | Closes the Zip Input Stream. |
| zip entry getNextEntry( ) | Reads the next zip file entry and positions stream at the beginning of the entry data. |
| int read( ) | Reads the next byte from the current zip entry. |
| int read(byte☐bytes, int start, int len) | Reads from the current zip entry into an array of bytes. |

TABLE 2

Example of Methods Associated With Central Header Subclass.

| Method | Description |
| --- | --- |
| int getBitFlag( ) | Returns the bit flag that is used to indicate the compression type and degree. |
| string getComment( ) | Returns the file comment. |
| long getCompressedSize( ) | Returns the size of the compressed entry data, or −1 if not known. |
| int getCompressionMethod( ) | Returns the compression method used for compressing the contents of this entry. |
| long getCrc( ) | Returns the CRC-32 checksum of the uncompressed entry data, or −1 if not known. |
| long getExternalAttributes( ) | Returns the file attribute/permission mask. |
| byte☐getExtra( ) | Returns the extra field data for the entry, or null if none. |
| int getExtractVersion( ) | Returns the minimum software version needed to extract the file. |
| string getFilename( ) | Returns the name of this entry. |
| int getInternalAttributes( ) | Returns the internal file attributes. |
| long getLocalHeaderOffset( ) | The offset from the start of the first disk on which this file appears to where the local header should be found. |
| int getStartDisk( ) | Returns the disk number of the zip archive that contains the start of the central directory. |
| long getTime( ) | Returns the modification time of the entry, or −1 if not specified. |
| long getUncompressedSize( ) | Returns the uncompressed size of the entry data, or −1 if not known. |
| int getVersionMadeBy( ) | Indicates the platform on which the file attributes are compatible. |

TABLE 3

Example of Methods Associated With Central Directory Subclass.

| Method | Description |
| --- | --- |
| int getCentralDirectoryDiskNumber( ) | Returns the number of the disk on which the central directory starts. |
| long getCentralDirectoryDiskOffset( ) | Returns the offset of the start of the central directory on the disk on which the directory starts. |
| long getCentralDirectoryOffset( ) | Returns the offset of the central directory. |
| long getCentralDirectorySize( ) | Returns the size of the central directory. |
| int getCentralEntryCount( ) | Returns the number of entries in the central directory. |
| int getDiskNumber( ) | Returns the number of the disk that the zip archive that this central directory came from. |
| string getZipfileComment( ) | Returns the zip file comment. |

Thus, the bytecode program calls on the methods associated with the central header subclass 424 and the central directory subclass 426 to access the contents of the central directory as it is received. For example, for the bytecode program to print the zip file comment as it is received, the bytecode program calls the getNextEntry( ) method from the zip input stream class 420 to read in an object instance of zip entry class 422. When the bytecode program recognizes that the object is an instance of the central directory subclass 424, the bytecode program executes the method getZipfileComment( ) on the object and prints out the result. In this way, the bytecode program does not need save the entire zip file to access the contents of the central directory.

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of accessing a streamed zip file comprising:
receiving a stream of data containing an un-extracted zip file, wherein the zip file comprises a set of files and a central directory; and
enabling a process to access contents of the central directory as the central directory is received.

2. The method of claim 1 wherein the enabling step comprises providing an interface for accessing contents of the central directory.

3. The method of claim 1 wherein the enabling step comprises:
reading in a central directory file header; and
providing an interface to access contents of the central directory file header.

4. The method of claim 1 wherein the enabling step comprises:
reading in an end of central directory record; and
providing an interface to access contents of the end of central directory record.

5. A system for receiving a streamed zip file, wherein the zip file comprises a set of files and a central directory, the system comprising:
a central processing unit;

an application program configured for execution by the central processing unit;

a receiving module, initiated by the application program, for receiving a streamed un-extracted zip file; and an interface module, initiated by the application program, for accessing contents of a central directory of the streamed zip file as the central directory is received.

6. The system of claim 5 wherein the interface module is a Java class comprising a central header subclass and a central directory subclass.

7. The system of claim 6 wherein the receiver module reads in a central directory header as an object instance of the central header subclass.

8. The system of claim 7 wherein the central header subclass comprises a set of methods for accessing contents of the object instance.

9. The system of claim 6 wherein the receiver module reads in an end of central directory record as an object instance of the central directory subclass.

10. The system of claim 9 wherein the central directory subclass comprises a set of methods for accessing contents of the object instance.

11. A computer program product for use in conjunction with a computer system, the computer program product comprising a computer readable storage medium and a computer program mechanism embedded therein, the computer program mechanism comprising:

a receiving module for receiving a streamed un-extracted zip file; and an interface module for accessing contents of a central directory of the streamed zip file as the central directory is received.

12. The computer program mechanism of claim 11 wherein the interface module is a Java class comprising a central header subclass and a central directory subclass.

13. The computer program mechanism of claim 12 wherein the receiver module reads in a central directory header as an object instance of the central header subclass.

14. The computer program mechanism of claim 13 wherein the central header subclass comprises a set of methods for accessing contents of the object instance.

15. The computer program mechanism of claim 12 wherein the receiver module reads in an end of central directory record as an object instance of the central directory subclass.

16. The computer program mechanism of claim 15 wherein the central directory subclass comprises a set of methods for accessing contents of the object instance.

17. A memory for storing data for access by an application program being executed on a computer system, comprising:

an interface stored in the memory, the interface for use with a receiver configured for receiving a streamed un-extracted zip file, wherein the zip file comprises a set of files and a central directory, the interface comprising a process for accessing contents of the central directory as the central directory is received.

18. The memory of claim 17 wherein the process is a Java class comprising a set of methods for accessing contents of an object instance of the Java class, wherein the object instance comprises a central directory header read in by the receiver.

19. The memory of claim 17 wherein the process is a Java class comprising a set of methods for accessing contents of an object instance of the Java class, wherein the object instance comprises an end of central directory record read in by the receiver.

* * * * *